(12) United States Patent
Kragel et al.

(10) Patent No.: US 11,941,273 B2
(45) Date of Patent: Mar. 26, 2024

(54) VARIABLE CAPACITY ZONE NAMESPACE (ZNS) FLASH STORAGE DATA PATH

(71) Applicant: Western Digital Technologies, Inc., San Jose, CA (US)

(72) Inventors: Oleg Kragel, San Jose, CA (US); Vijay Sivasankaran, Dublin, CA (US); Mikhail Palityka, Oakville (CA); Lawrence Vazhapully Jacob, Folsom, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/743,295

(22) Filed: May 12, 2022

(65) Prior Publication Data

US 2023/0367500 A1 Nov. 16, 2023

(51) Int. Cl.
*G06F 3/06* (2006.01)
(52) U.S. Cl.
CPC ............ *G06F 3/064* (2013.01); *G06F 3/0607* (2013.01); *G06F 3/0635* (2013.01); *G06F 3/0679* (2013.01)

(58) Field of Classification Search
CPC ...... G06F 3/064; G06F 3/0607; G06F 3/0635; G06F 3/0679
See application file for complete search history.

(56) References Cited

U.S. PATENT DOCUMENTS

| | | | |
|---|---|---|---|
| 7,558,197 B1 | 7/2009 | Sindhu et al. | |
| 8,423,713 B2 | 4/2013 | Hamaguchi | |
| 9,927,983 B2 | 3/2018 | Benisty et al. | |
| 10,379,742 B2 | 8/2019 | Smith et al. | |
| 10,572,160 B1 | 2/2020 | Farhan et al. | |
| 11,036,407 B1* | 6/2021 | Tikoo | G06F 3/0653 |
| 2002/0091882 A1 | 7/2002 | Espeseth et al. | |
| 2019/0042150 A1 | 2/2019 | Wells et al. | |
| 2019/0354478 A1* | 11/2019 | Kashyap | G06F 11/1072 |
| 2020/0089407 A1 | 3/2020 | Baca et al. | |
| 2020/0167274 A1 | 5/2020 | Bahirat et al. | |
| 2020/0356306 A1 | 11/2020 | Subbarao | |
| 2020/0356484 A1 | 11/2020 | Subbarao | |
| 2020/0393974 A1 | 12/2020 | Bahirat | |
| 2021/0056023 A1 | 2/2021 | Jin et al. | |

(Continued)

FOREIGN PATENT DOCUMENTS

CN 111694515 A 9/2020

*Primary Examiner* — Francisco A Grullon
(74) *Attorney, Agent, or Firm* — Michael Best & Friedrich LLP

(57) ABSTRACT

Variable Capacity Zone Namespace (ZNS) Flash Storage Data Path. In one example, a data storage device including an electronic processor that, when executing a variable capacity scheme, is configured to determine whether a special indication regarding a particular zone in a ZNS is received, delay an association of a final flash block with the particular zone, receive and stage host data for the particular zone in a staging area, receive a zone close request, compact the host data with other host data for storage in other zones into second host data, and move the second host data to the final flash block that is associated with the particular zone and the other zones. The compaction of the host data with the other host data into the second host data reduces or eliminates padding in the final flash block, and consequently, reduces overhead in the data storage device.

20 Claims, 6 Drawing Sheets

(56) References Cited

U.S. PATENT DOCUMENTS

| | | | |
|---|---|---|---|
| 2021/0132827 A1* | 5/2021 | Helmick | G06F 3/0629 |
| 2021/0208800 A1 | 7/2021 | Yang | |
| 2022/0027472 A1* | 1/2022 | Golden | G06F 21/78 |
| 2022/0050627 A1* | 2/2022 | Pratt | G11C 16/10 |
| 2022/0066868 A1* | 3/2022 | Betz | G06F 11/076 |
| 2023/0089022 A1 | 3/2023 | Miyamoto | |

* cited by examiner

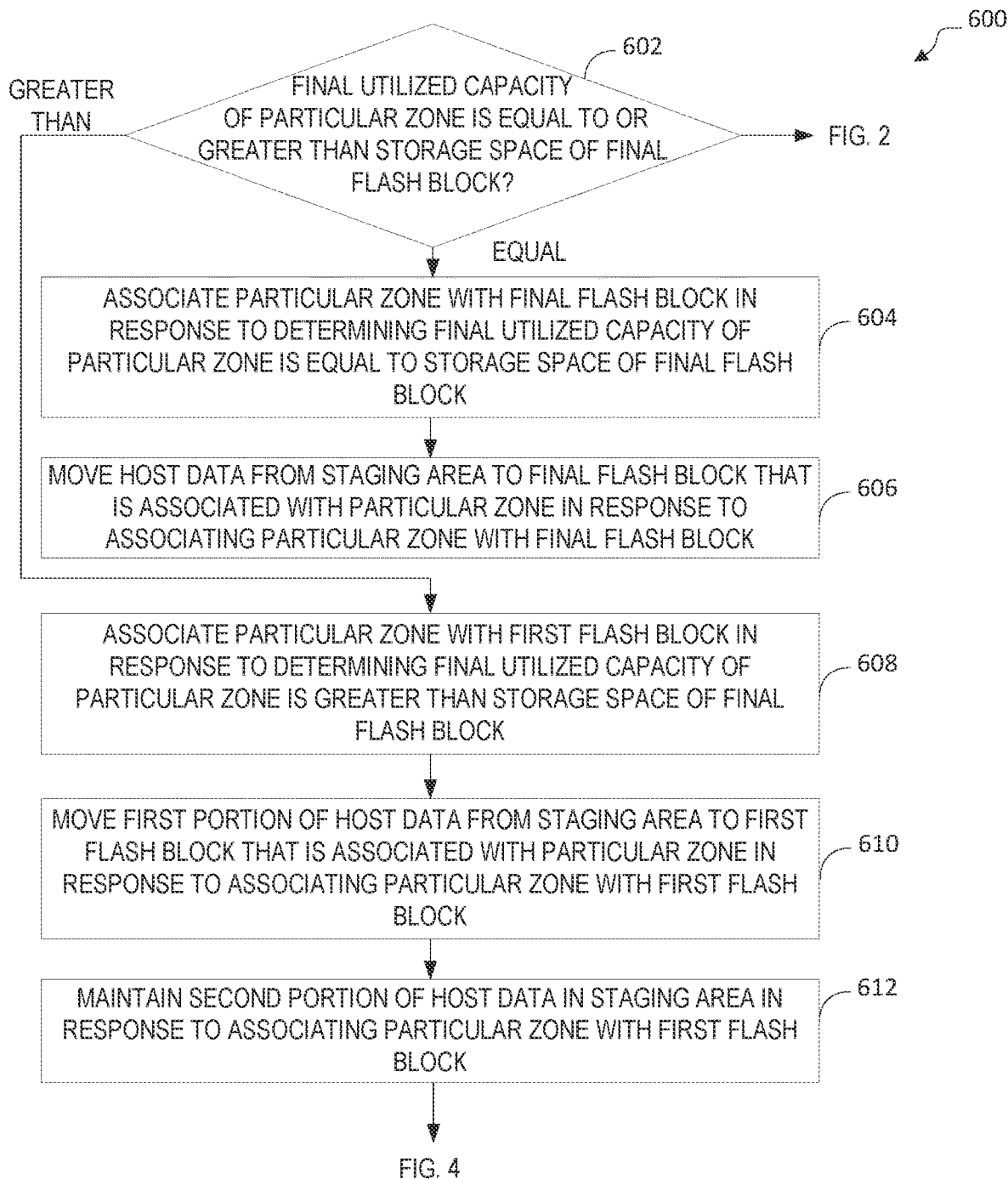

VARIABLE CAPACITY ZONE NAMESPACE (ZNS) FLASH STORAGE DATA PATH

FIELD

This application relates generally to data storage devices, and more particularly, to a controller including a variable capacity zone namespace (ZNS) flash storage data path.

BACKGROUND

Typically, Zone Namespace (ZNS) implementation associates every zone with one or more flash blocks storing host data belonging to a single zone. When the zone is overwritten or explicitly reset, the one or more flash blocks associated with previous version of this zone are invalidated. With this invalidation process, flash block space is generally available at the time the flash block space is required.

SUMMARY

However, when a host decides to explicitly close not fully written zones, additional actions may be necessary to ensure host data readability taking place in a final flash block associated with the zone. To reduce or eliminate the overhead associated with the additional actions, the embodiments described herein provide a variable capacity scheme to compact host data from multiple zones into host data that is stored in a final flash block that is associated with the multiple zones.

One embodiment of the present disclosure includes a data storage device. The data storage device includes a memory and a data storage controller. The data storage controller includes an electronic processor and a data storage controller memory that includes a variable capacity scheme. The electronic processor, when executing the variable capacity scheme, is configured to determine whether a special indication is received from a host regarding a particular zone in the ZNS, delay an association of a final flash block for the particular zone in response determining that to the special indication is received from the host regarding the particular zone in the ZNS, receive host data from the host for storage in the particular zone, stage the host data in a staging area in response to receiving the host data from the host, receive a zone close request regarding the particular zone from the host, compact, with a folding algorithm, the host data for storage in the particular zone with other host data for storage in other zones into second host data, and moving, with the folding algorithm, the second host data from the staging area to the final flash block that is associated with the particular zone and the other zones Another embodiment of the present disclosure includes a method. The method includes determining, with a data storage controller, whether a special indication is received from a host regarding a particular zone in a Zone Namespace (ZNS). The method includes delaying, with the data storage controller, an association of a final flash block for the particular zone in response to determining that the special indication is received from the host regarding the particular zone in the ZNS. The method includes receiving, with the data storage controller, host data from the host for storage in the particular zone. The method includes staging, with the data storage controller, the host data in a staging area in response to receiving the host data from the host. The method includes receiving, with the data storage controller, a zone close request regarding the particular zone from the host. The method includes compacting, with the data storage controller and a folding algorithm, the host data for storage in the particular zone with other host data for storage in other zones into second host data. The method also includes moving, with the data storage controller and the folding algorithm, the second host data from the staging area to the final flash block that is associated with the particular zone and the other zones.

Yet another embodiment of the present disclosure includes an apparatus. The apparatus includes means for determining whether a special indication is received from a host regarding a particular zone in a Zone Namespace (ZNS). The apparatus includes means for delaying an association of a final flash block for the particular zone in response to determining that the special indication is received from the host regarding the particular zone in the ZNS. The apparatus includes means for receiving host data from the host for storage in the particular zone. The apparatus includes means for staging the host data in a staging area in response to receiving the host data from the host. The apparatus includes means for receiving a zone close request regarding the particular zone from the host. The apparatus includes means for compacting the host data for storage in the particular zone with other host data for storage in other zones into second host data. The apparatus also includes means for moving the second host data from the staging area to the final flash block that is associated with the particular zone and the other zones.

Various aspects of the present disclosure provide for improvements in data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

BRIEF DESCRIPTION OF THE DRAWINGS

FIG. 6 is a flow diagram illustrating an example of an extension from the compaction block of FIG. 4, in accordance with some embodiments.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, or other suitable solid-state memory.

Figure 1:
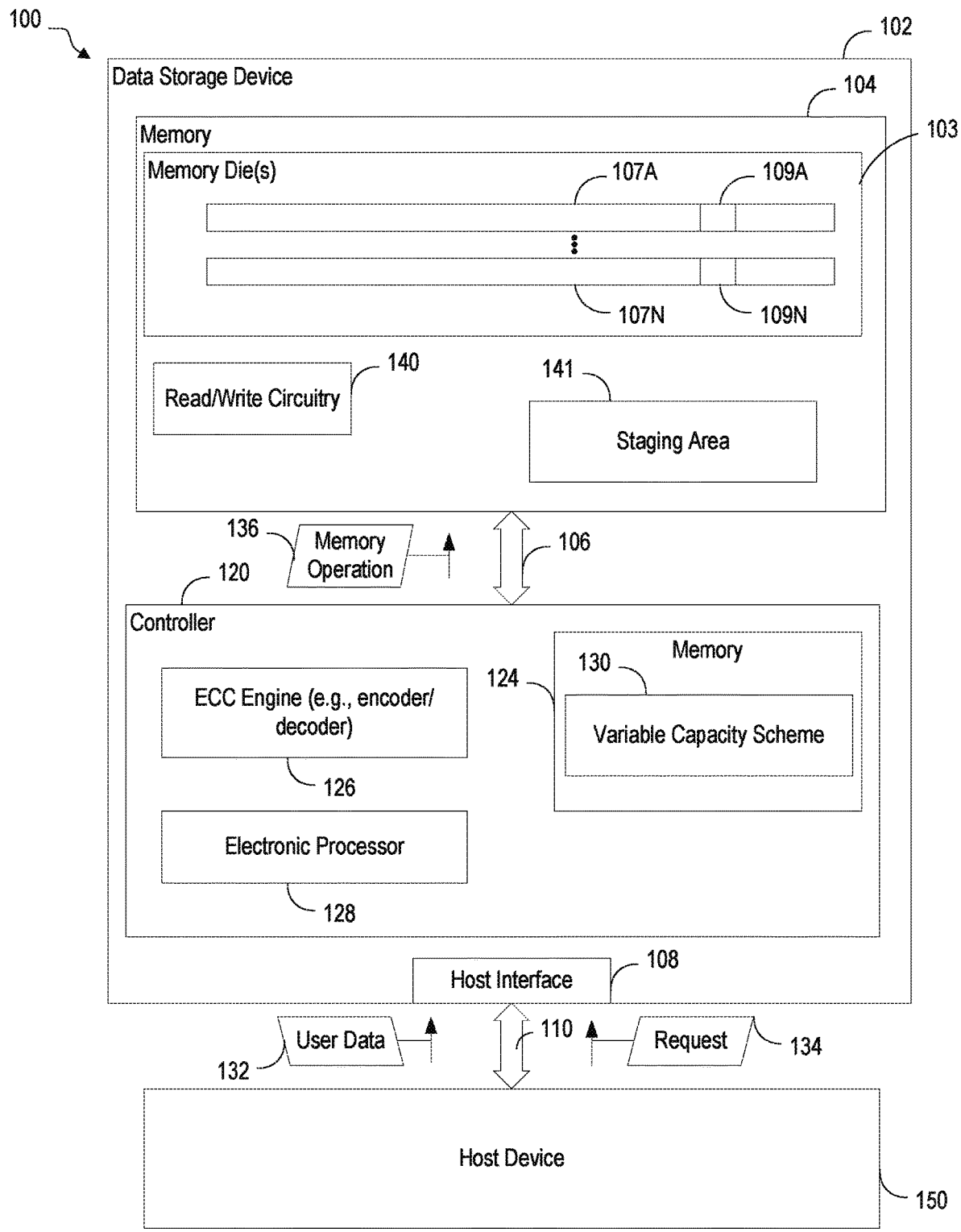
FIG. 1 is block diagram of a system including a data storage device and a host device, in accordance with some embodiments of the disclosure.

FIG. 1 is block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage controller") and a memory 104 (e.g., non-volatile memory) that is coupled to the data storage controller 120.

One example of the structural and functional features provided by the data storage controller 120 are illustrated in FIG. 1 in a simplified form. One skilled in the art would also recognize that the data storage controller 120 may include additional modules or components other than those specifically illustrated in FIG. 1. Additionally, although the data storage device 102 is illustrated in FIG. 1 as including the data storage controller 120, in other implementations, the data storage controller 120 is instead located separate from the data storage device 102. As a result, operations that would normally be performed by the data storage controller 120 described herein may be performed by another device that connects to the data storage device 102.

The data storage device 102 and the host device 150 may be operationally coupled via a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 via the communication path 110, such as a wired communication path and/or a wireless communication path. For example, the data storage device 102 may include an interface 108 (e.g., a host interface) that enables communication via the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. Additionally, the host device 150 may issue one or more vendor specific commands to the data storage device 102 to notify and/or configure the data storage device 102. For example, the host device 150 may be configured to provide data, such as user data 132, to be stored at the memory 104 or to request data to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates via a memory interface that enables reading from the memory 104 and writing to the memory 104. In some examples, the host device 150 may operate in compliance with an industry specification, a Secure Digital (SD) Host Controller specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more flash blocks (e.g., one or more erase blocks). Each flash block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies.

The memory 104 may also include a staging area, such as staging area 141, to support the operation of a variable capacity scheme as described below in FIG. 4. Although depicted as a component that is separate from the one or more memory dies 103 of memory 104, the staging area 141 may be storage space in the one or more memory dies 103 set aside for the operation of the variable capacity scheme.

Additionally, the staging area as described herein is not limited to the staging area 141, which is illustrated within the memory 104. In some examples, the staging area may be located external to the memory 104. For example, a staging area may be located in the memory 124, may be located in other memory within the data storage device 102 (not shown), or may be located external to the data storage device 102 (e.g., in the host 150).

The data storage device 102 includes the data storage controller 120 coupled to the memory 104 (e.g., the one or more memory dies 103) via a bus 106, an interface (e.g., interface circuitry), another structure, or a combination thereof. For example, the bus 106 may include multiple distinct channels to enable the data storage controller 120 to communicate with each of the one or more memory dies 103 in parallel with, and independently of, communication with the other memory dies 103. In some implementations, the memory 104 may be a flash memory.

The data storage controller 120 is configured to receive data and instructions from the host device 150 and to send data to the host device 150. For example, the data storage controller 120 may send data to the host device 150 via the interface 108, and the data storage controller 120 may receive data from the host device 150 via the interface 108. The data storage controller 120 is configured to send data and commands (e.g., the memory operation 136) to the memory 104 and to receive data from the memory 104. For example, the data storage controller 120 is configured to send data and a write command to cause the memory 104 to store data to a specified address of the memory 104. The write command may specify a physical address of a portion of the memory 104 (e.g., a physical address of a word line of the memory 104) that is to store the data.

The data storage controller 120 is configured to send a read command to the memory 104 to access data from a specified address of the memory 104. The read command may specify the physical address of a region of the memory 104 (e.g., a physical address of a word line of the memory 104). The data storage controller 120 may also be configured to send data and commands to the memory 104 associated with background scanning operations, garbage collection operations, and/or wear-leveling operations, or other suitable memory operations.

The data storage controller 120 may include a memory 124 (for example, a random access memory ("RAM"), a read-only memory ("ROM"), a non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128. For example, the memory 124 stores a variable capacity scheme 130 as described in greater detail below in FIG. 4.

Additionally, although the data storage controller 120 is illustrated in FIG. 1 as including the memory 124, in other implementations, some or all of the memory 124 is instead located separate from the data storage controller 120 and executable by the electronic processor 128 or a different electronic processor that is external to the data storage controller 120 and/or the data storage device 102. For example, the memory 124 may be dynamic random-access memory (DRAM) that is separate and distinct from the data storage controller 120. As a result, operations that would normally be performed solely by the data storage controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage controller 120 and in communication with memory of the data storage device 102, and 4) a different electronic processor that is external to the data storage controller 120 and in communication with memory that is external to the data storage device 102.

The data storage controller 120 may send the memory operation 136 (e.g., a read command) to the memory 104 to cause the read/write circuitry 140 to sense data stored in a storage element. For example, the data storage controller 120 may send the read command to the memory 104 in response to receiving a request for read access from the host device 150.

Figure 2:
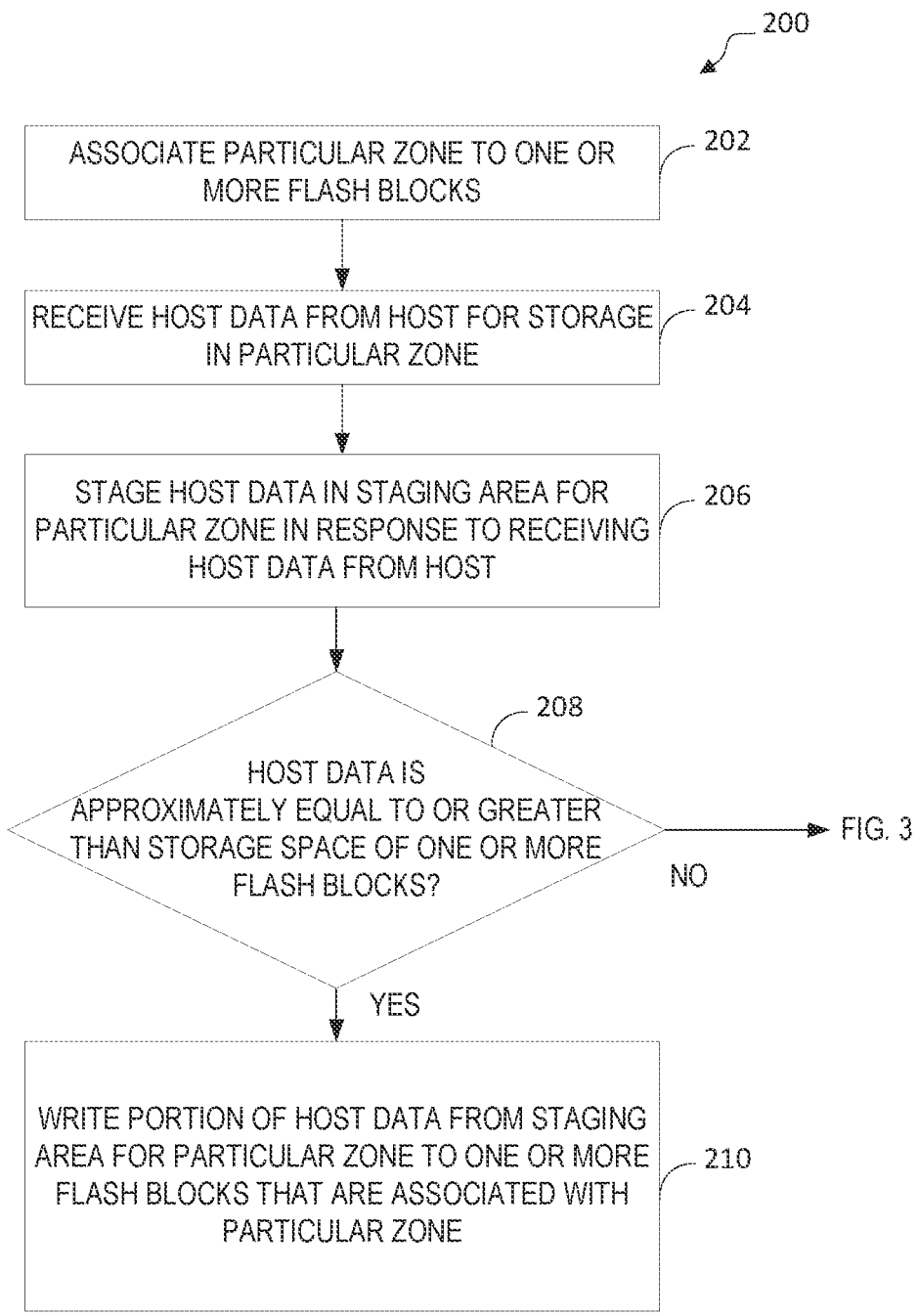
FIG. 2 is a flow diagram illustrating a comparative approach that associates every ZNS zone with one flash block that stores host data belonging to a single zone.

FIG. 2 is a flow diagram illustrating a comparative approach 200 that associates every ZNS zone with one flash block that stores host data belonging to a single zone. FIG. 2 is described with respect to FIG. 1.

In the comparative approach 200, the data storage controller 120 associates a particular zone to one or more flash blocks (at block 202). For example, the data storage controller 120 may associate one zone to one flash block.

In the comparative approach 200, the data storage controller 120 receives host data from the host 150 for storage in the particular zone (at block 204).

In the comparative approach 200, the data storage controller 120 stages the host data from the host 150 in a staging area for a particular zone in response to receiving the host data from the host 150 (at block 206). In some examples, the staging area is in the RAM of the data controller 120. In other examples, the staging area is in an open Flash block of the memory 104, which may be the final flash block location in the memory 104.

In the comparative approach 200, the data storage controller 120 determine whether the staging of the host data in the staging area for the particular zone is complete by determining whether the host data is approximately equal to or greater than the storage space of the one or more flash blocks that are associated with the particular zone (at decision block 208). In some examples, the data storage controller 120 may receive an explicit zone close request from the host 150 for the particular zone and the determination of whether the staging area for the particular zone is complete is in response to receiving the explicit zone close request from the host 150. In other examples, the data storage controller 120 may periodically perform the determination without any request from the host 150.

In the comparative approach 200, in response to determining that the staging of the host data in the staging area for the particular zone is complete ("YES" at decision block 208), the data storage controller 120 writes a portion of the host data from the staging area for the particular zone to the one or more flash blocks that are associated with the particular zone.

Additionally, in some examples, the data storage controller 120 may overwrite or explicitly reset a particular zone, the flash block previously associated with the particular zone is then invalidated. The invalidation of the flash block ensures that flash block space is always available in the time that it is required.

Further, when the host 150 discontinues writing to the particular zone, the one or more flash blocks previously associated with the particular zone may be preserved by the host 150 with an explicit zone close request. However, in the event a significant amount of host write traffic by the host 150 is explicitly closing not fully written zones ("NO" at decision block 208), then additional actions by the data storage device 102 may be necessary to ensure host data readability taking place in a final flash block associated with the zone. These additional actions may reduce a performance response of the data storage device 102.

Figure 3:
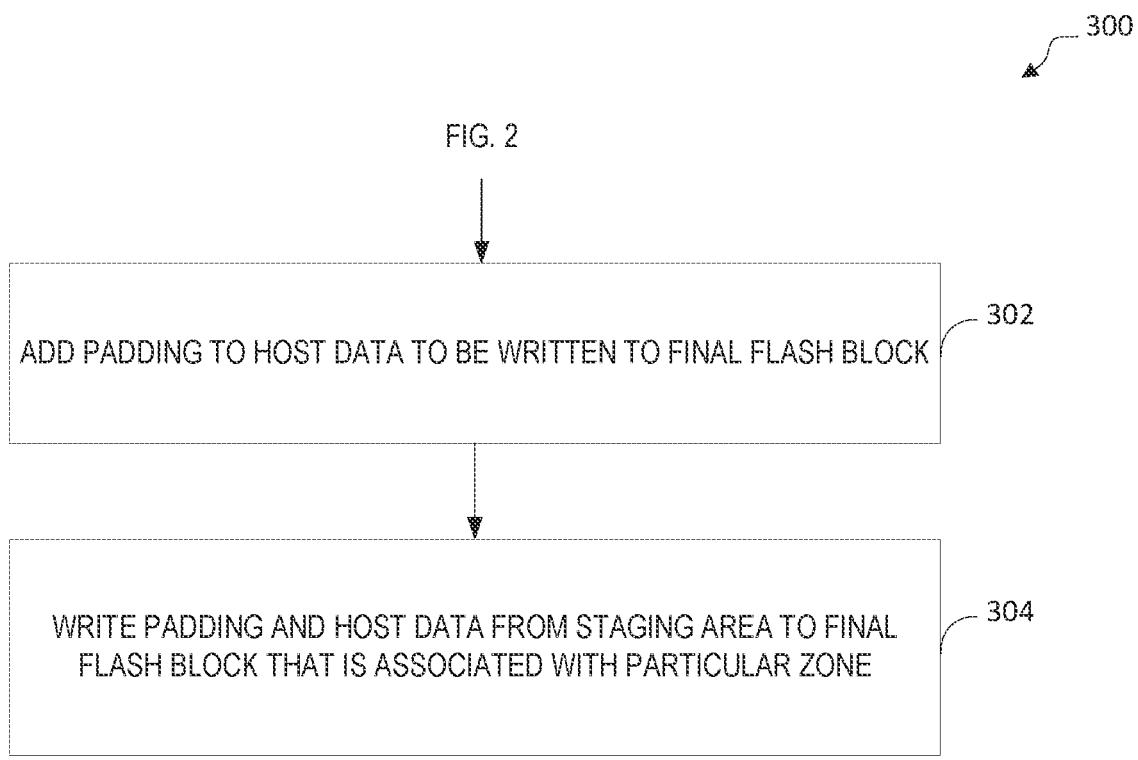
FIG. 3 is a flow diagram illustrating an example of an additional action.

For example, FIG. 3 is a flow diagram illustrating an example of an additional action 300. FIG. 3 is described with respect to FIG. 1.

As illustrated in FIG. 3, the additional action 300 includes the data storage controller 120 adding padding to the host data to be written to the final flash block (at block 302). The addition of padding to the host data adds overhead to the data storage controller 120 and impacts write performance.

The additional action 300 also includes the data storage controller 120 writing the padding and the host data from the staging area to the final flash block that is associated with the particular zone (at block 304).

Figure 4:
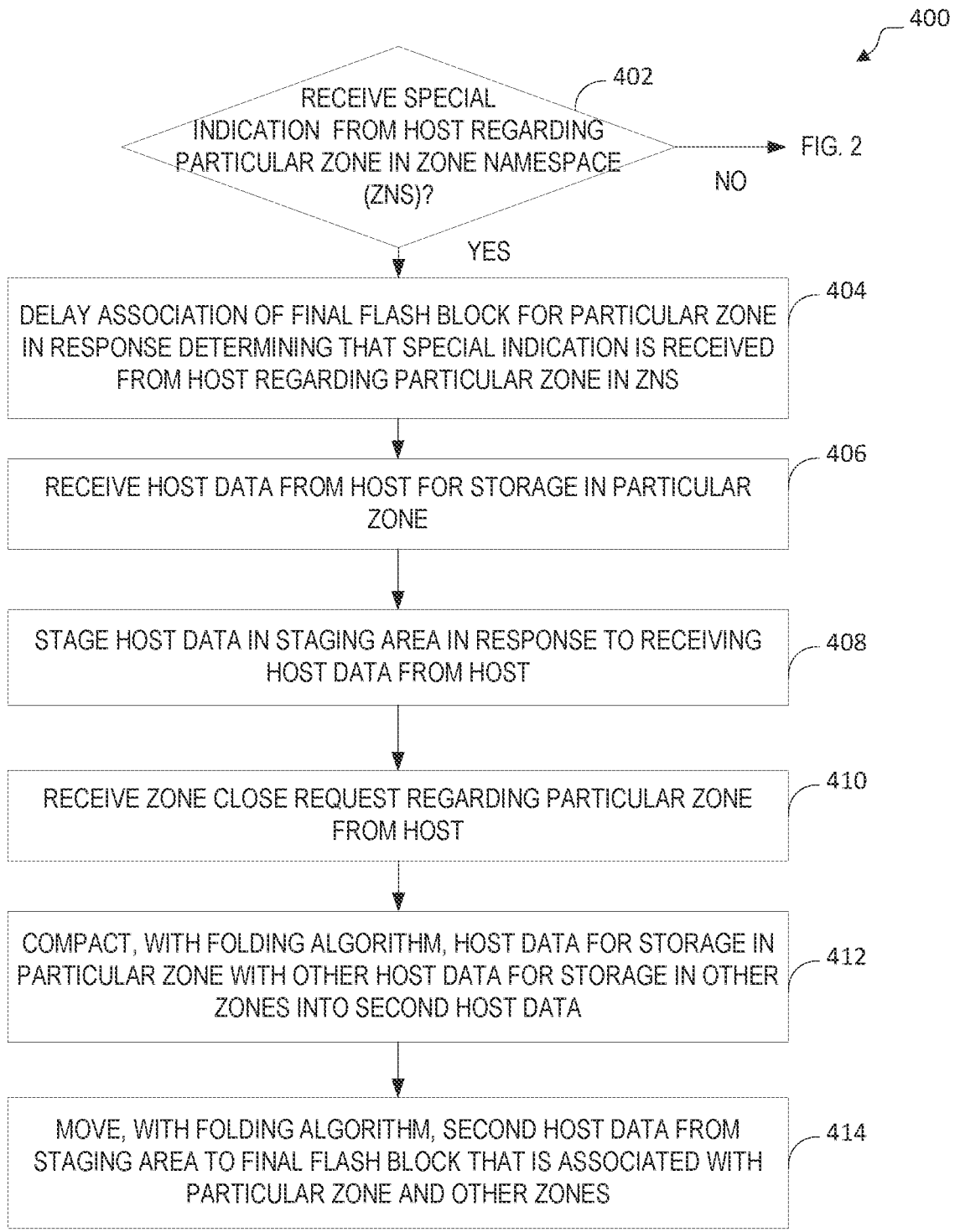
FIG. 4 is a flow diagram illustrating a first example of a variable capacity scheme, in accordance with some embodiments.

To solve issues identified with respect to the comparative approach 200 and the additional action 300, FIG. 4 is a flow diagram illustrating a variable capacity scheme 400 (corresponding to the variable capacity scheme 130 of FIG. 1), in accordance with some embodiments. FIG. 4 is described with respect to FIG. 1.

Zones with their actual required capacity being unknown require a special indication from the host 150 that may be provided via a ZNS commands set. In the variable capacity scheme 400, the data storage controller 120 determines whether a special indication is received from the host 150 regarding a particular zone in zone namespace (ZNS) (at decision block 402).

In the variable capacity scheme 400, zone in response to determining that the special indication is received from the host 150 ("YES" at decision block 402), the data storage controller 120 delays an association of a final flash block for the particular (at block 404). In some examples, the final flash block is commonly associated for single zone storage.

In the variable capacity scheme 400, the data storage controller 120 receives host data from the host 150 for storage in the particular zone (at block 406).

In the variable capacity scheme 400, the data storage controller 120 stages the host data for the particular zone in a staging area in response to receiving the host data from the host 150 (at block 408). In some examples, the staging area is in the RAM of the data controller 120. In other examples, the staging area is in an open Flash block of the memory 104.

In the variable capacity scheme 400, the data storage controller 120 receives a zone close request from the host 150 regarding the particular zone (at block 410).

In the variable capacity scheme 400, the data storage controller 120 compacts, with a folding algorithm, the host data for storage in the particular zone with other host data for storage in other zones into second host data, the second host data being equal to a storage space of the final flash block (at block 412). No additional writes to staging area are necessary as part of that compaction algorithm, the compaction algorithm simply decides what variable capacity zones among those present in staging area fit optimally (with minimal padding) in a capacity of one or more final destination flash blocks (e.g., TLC/QLC).

In the variable capacity scheme 400, the data storage controller 120 moves, with the folding algorithm, the second host data from the staging area to the final flash block that is associated with the particular zone and the other zones in response to compacting the host data with the other host data into second host data (at block 414). The folding algorithm may also ensure data readability after the folding process of moving the host data to the final flash block is complete. For example, the folding readability ensuring algorithm may be Enhanced Post-Write Read (EPWR), where certain pages that are likelier to show read errors are read. When the EPWR sequence finishes with no errors, then the flash block is considered as fully readable.

The overhead associated with the compaction described in block 412 is less than overheads associated with padding the host data of under-utilized flash blocks. In other words, one advantage of the variable capacity scheme 400 is reducing or eliminating padding in each flash block of under-utilized flash blocks.

Additionally, in some examples, the variable capacity scheme 400 may also include the data storage controller 120 deciding, with the folding algorithm, on whether splitting the zone's data over two flash storage blocks is beneficial under a constraint that there could be no more than two zones in one flash storage block that store their data in two flash storage blocks.

Furthermore, when the host 150 does not support the variable capacity scheme 400 ("NO" at decision block 402), all of the zones in the data storage device 102 will need to follow the path for zones with unknown capacity, i.e., perform the comparative approach 200 and the additional action 300 as illustrated in FIGS. 2 and 3, respectively.

Figure 5:
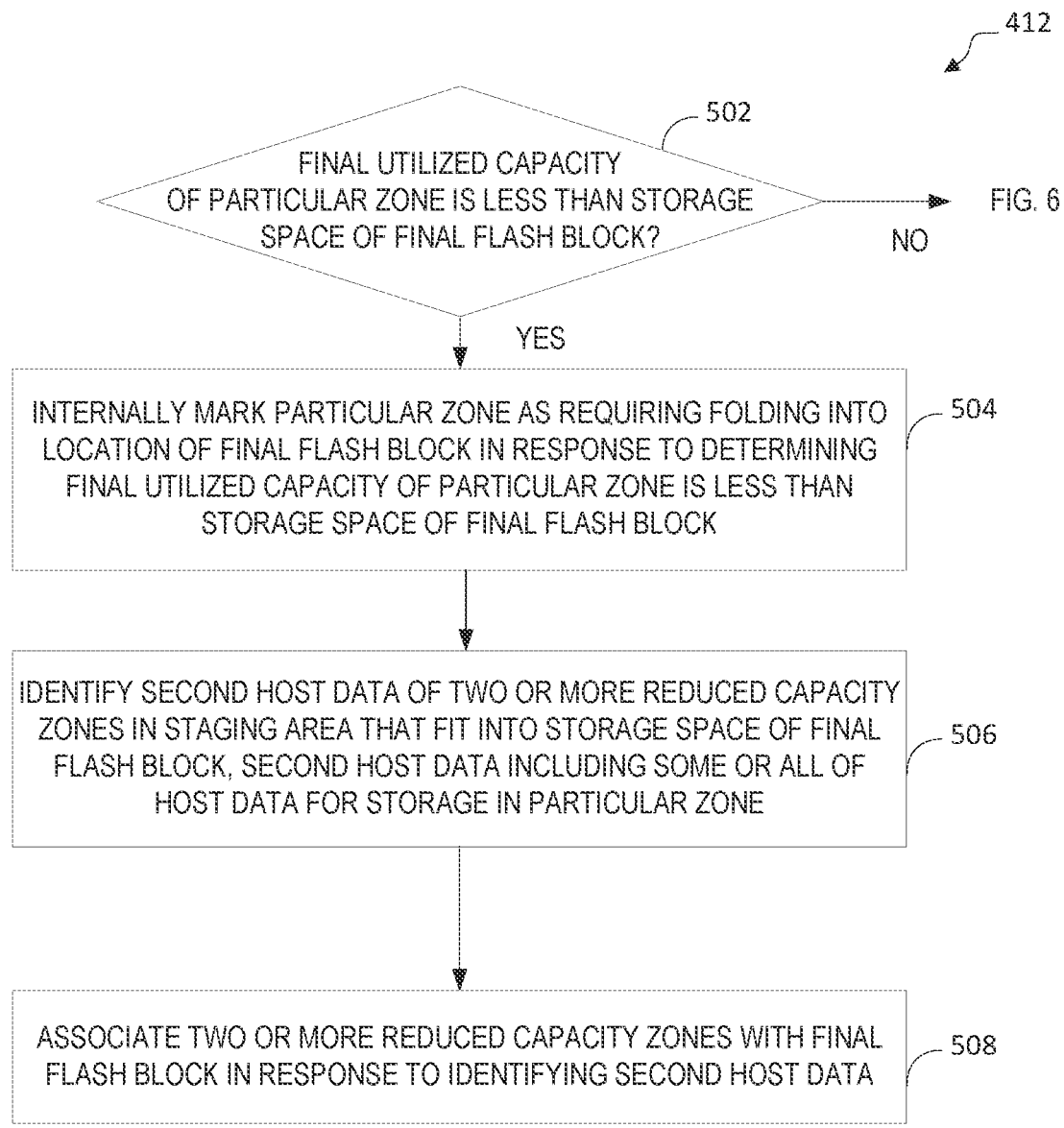
FIG. 5 is a flow diagram illustrating an example of the compaction block of FIG. 4, in accordance with some embodiments.

FIG. 5 is a flow diagram illustrating an example of the compaction block 412 of FIG. 4, in accordance with some embodiments. In the example of the compaction block 412, the data storage controller 120 determines whether a final utilized capacity of the particular zone is less than a storage space of the final flash block in response to receiving receive the zone close request (at decision block 502).

In the example of the compaction block 412, in response to determining the final utilized capacity of the particular zone is less than the storage space of the final flash block ("YES" at decision block 502), the data storage controller 120 internally marks the particular zone as requiring folding into a location of the final flash block (at block 504).

In the example of the compaction block 412, the data storage controller 120 identifies, with a folding algorithm, second host data of two or more reduced capacity zones in the staging area that fit into the storage space of the final flash block, the second host data including some or all of the host data for the storage in the particular zone in response to internally marking the particular zone as requiring folding into the location of the final flash block (at block 506). In this example, the two or more reduced capacity zones includes the particular zone.

In the example of the compaction block 412, the data storage controller 120 associates, with the folding algorithm, the two or more reduced capacity zones with the final flash block in response to identifying the second host data (at block 508).

FIG. 6 is a flow diagram illustrating an example of an extension 600 from the compaction block 412 of FIGS. 4 and 5, in accordance with some embodiments. The extension 600 addresses a situation where the host data cannot be compacted with the compaction block 412 of FIG. 4 after receiving the zone close request from the host 150.

In the example of the extension 600, the data storage controller 120 determines whether the staging of the host data in the staging area for the particular zone is complete by determining whether the host data is approximately equal to or greater than the storage space of the final flash block (at decision block 602).

In the example of the extension 600, in response to determining the final utilized capacity of particular zone is equal to the storage space of the final flash block ("EQUAL" at decision block 602), the data storage controller 120 associates the particular zone with the final flash block (at block 604).

In the example of the extension 600, the data storage controller 120 moves the host data from the staging area to the final flash block that is associated with the particular zone in response to associating the particular zone with the final flash block (at block 606).

In the example of the extension 600, in response to determining the final utilized capacity of particular zone is greater than the storage space of the final flash block ("GREATER THAN" at decision block 602), the data storage controller 120 associates the particular zone with a first flash block (at block 608).

In the example of the extension 600, the data storage controller 120 moves a first portion of the host data from the staging area to the first flash block that is associated with the particular zone in response to associating the particular zone with the first flash block (at block 610).

In the example of the extension 600, the data storage controller 120 maintains a second portion of the host data in the staging area in response to associating the particular zone with the first flash block (at block 612). In some examples, the data storage controller 120 also re-performs the variable capacity scheme 400 when maintaining the second portion of the host data in the staging area.

With respect to the extension 600, when the host data of the variable capacity zone is split over two final flash blocks, those two locations (one in the end of block 1 and another one in the beginning of block 2) are associated with the identifier of that zone. The association is stored in zone location table (e.g., a ZNS variant of a Logical-to-Physical Translation Table (L2PTT)), which is a flat table, where index/offset in table is the zone identifier (ID). In this example, the value of the zone ID is a pair of final flash block locations with a second of the final flash block locations unused when the zone's data is fully contained within the first final flash block.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device comprising:
   a memory including a plurality of zones in a Zone Namespace (ZNS); and
   a data storage controller including an electronic processor and a data storage controller memory that includes a variable capacity scheme, the electronic processor, when executing the variable capacity scheme, is configured to:
      determine whether a special indication is received from a host regarding a particular zone in the ZNS,
      delay an association of a final flash block for the particular zone in response determining that to the special indication is received from the host regarding the particular zone in the ZNS,
      receive host data from the host for storage in the particular zone,
      stage the host data in a staging area in response to receiving the host data from the host,
      receive a zone close request regarding the particular zone from the host, and
      perform a folding algorithm, the folding algorithm includes
         compacting the host data for storage in the particular zone with other host data for storage in other zones into second host data, and
         moving the second host data from the staging area to the final flash block that is associated with the particular zone and the other zones.

2. The data storage device of claim 1, wherein, compacting the host data for storage in the particular zone with the other host data for storage in the other zones into the second host data, the electronic processor is further configured to:
   determine whether a final utilized capacity of the particular zone is less than a storage space of the final flash block in response to receiving receive the zone close request,
   internally mark the particular zone as requiring folding into a location of the final flash block in response to determining the final utilized capacity of the particular zone is less than the storage space of the final flash block,
   identify the second host data of two or more reduced capacity zones in the staging area that fit into the storage space of the final flash block in response to internally marking the particular zone as requiring folding into the location of the final flash block, the second host data including some or all of the host data for the storage in the particular zone, and
   associate the two or more reduced capacity zones with the final flash block in response to identifying the second host data.

3. The data storage device of claim 2, wherein the electronic processor is further configured to:
   determine whether the final utilized capacity of the particular zone is equal to or greater than the storage space of the final flash block in response to receiving receive the zone close request,
   associate the particular zone with the final flash block in response to determining the final utilized capacity of the particular zone is equal to the storage space of the final flash block, and
   move the host data from the staging area to the final flash block that is associated with the particular zone in response to associating the particular zone with the final flash block.

4. The data storage device of claim 3, wherein the electronic processor is further configured to:
   associate the particular zone with a first flash block in response to determining the final utilized capacity of the particular zone is greater than the storage space of the final flash block,
   move a first portion of the host data from the staging area to the first flash block that is associated with the particular zone in response to associating the particular zone with the first flash block, and
   maintain a second portion of the host data in the staging area in response to associating the particular zone with the first flash block.

5. The data storage device of claim 1, wherein the electronic processor is further configured to:
   associate the particular zone with the final flash block in response to determining that to the special indication is not received from the host regarding the particular zone in the ZNS,
   receive the host data from the host for storage in the particular zone, stage the host data in the staging area in response to receiving the host data from the host,
determine whether the staging of the host data in the staging area for the particular zone is complete by determining whether the host data is approximately equal to or greater than a storage space of the final flash block, and
write a portion of the host data from the staging area for the particular zone to the final flash block that is associated with the particular zone in response to determining that the staging of the host data in the staging area for the particular zone is complete.

6. The data storage device of claim 5, wherein the electronic processor is configured to:
add padding to the host data in response to determining that the staging of the host data in the staging area for the particular zone is not complete, and
writing the padding and the host data from the staging area for the particular zone to the final flash block that is associated with the particular zone in response to adding the padding to the host data,
wherein an amount of the padding and the host data is equal to the storage space of the final flash block.

7. The data storage device of claim 1, wherein an amount of the second host data is equal to a storage space of the final flash block that is associated with the particular zone and the other zones.

8. A method comprising:
determining, with a data storage controller, whether a special indication is received from a host regarding a particular zone in a Zone Namespace (ZNS);
delaying, with the data storage controller, an association of a final flash block for the particular zone in response to determining that the special indication is received from the host regarding the particular zone in the ZNS;
receiving, with the data storage controller, host data from the host for storage in the particular zone;
staging, with the data storage controller, the host data in a staging area in response to receiving the host data from the host;
receiving, with the data storage controller, a zone close request regarding the particular zone from the host; and
performing, with the data storage controller, a folding algorithm, the folding algorithm includes
compacting the host data for storage in the particular zone with other host data for storage in other zones into second host data, and
moving the second host data from the staging area to the final flash block that is associated with the particular zone and the other zones.

9. The method of claim 8, wherein compacting the host data for storage in the particular zone with the other host data for storage in the other zones into the second host data further includes
determining whether a final utilized capacity of the particular zone is less than a storage space of the final flash block in response to receiving receive the zone close request;
internally marking the particular zone as requiring folding into a location of the final flash block in response to determining the final utilized capacity of the particular zone is less than the storage space of the final flash block;
identifying the second host data of two or more reduced capacity zones in the staging area that fit into the storage space of the final flash block in response to internally marking the particular zone as requiring folding into the location of the final flash block, the second host data including some or all of the host data for the storage in the particular zone, and
associating the two or more reduced capacity zones with the final flash block in response to identifying the second host data.

10. The method of claim 9, further comprising:
determining whether the final utilized capacity of the particular zone is equal to or greater than the storage space of the final flash block in response to receiving receive the zone close request;
associating the particular zone with the final flash block in response to determining the final utilized capacity of the particular zone is equal to the storage space of the final flash block; and
moving the host data from the staging area to the final flash block that is associated with the particular zone in response to associating the particular zone with the final flash block.

11. The method of claim 10, further comprising:
associating the particular zone with a first flash block in response to determining the final utilized capacity of the particular zone is greater than the storage space of the final flash block;
moving a first portion of the host data from the staging area to the first flash block that is associated with the particular zone in response to associating the particular zone with the first flash block; and
maintaining a second portion of the host data in the staging area in response to associating the particular zone with the first flash block.

12. The method of claim 8, further comprising:
associating the particular zone with the final flash block in response to determining that to the special indication is not received from the host regarding the particular zone in the ZNS;
receiving the host data from the host for storage in the particular zone;
staging the host data in the staging area in response to receiving the host data from the host;
determining whether the staging of the host data in the staging area for the particular zone is complete by determining whether the host data is approximately equal to or greater than a storage space of the final flash block; and
writing a portion of the host data from the staging area for the particular zone to the final flash block that is associated with the particular zone in response to determining that the staging of the host data in the staging area for the particular zone is complete.

13. The method of claim 12, further comprising:
adding padding to the host data in response to determining that the staging of the host data in the staging area for the particular zone is not complete; and
writing the padding and the host data from the staging area to the final flash block that is associated with the particular zone in response to adding the padding to the host data,
wherein an amount of the padding and the host data is equal to the storage space of the final flash block.

14. The method of claim 8, wherein an amount of the second host data is equal to a storage space of the final flash block that is associated with the particular zone and the other zones.

15. An apparatus comprising:
means for determining whether a special indication is received from a host regarding a particular zone in a Zone Namespace (ZNS);
means for delaying an association of a final flash block for the particular zone in response to determining that the special indication is received from the host regarding the particular zone in the ZNS;
means for receiving host data from the host for storage in the particular zone;
means for staging the host data in a staging area in response to receiving the host data from the host;
means for receiving a zone close request regarding the particular zone from the host; and
means for performing a folding algorithm, the folding algorithm includes
means for compacting the host data for storage in the particular zone with other host data for storage in other zones into second host data, and
means for moving the second host data from the staging area to the final flash block that is associated with the particular zone and the other zones.

16. The apparatus of claim 15, wherein means for compacting the host data for storage in the particular zone with the other host data for storage in the other zones into the second host data further includes
means for determining whether a final utilized capacity of the particular zone is less than a storage space of the final flash block in response to receiving receive the zone close request;
means for internally marking the particular zone as requiring folding into a location of the final flash block in response to determining the final utilized capacity of the particular zone is less than the storage space of the final flash block;
means for identifying the second host data of two or more reduced capacity zones in the staging area that fit into the storage space of the final flash block in response to internally marking the particular zone as requiring folding into the location of the final flash block, the second host data including some or all of the host data for the storage in the particular zone; and
means for associating the two or more reduced capacity zones with the final flash block in response to identifying the second host data.

17. The apparatus of claim 16, further comprising:
means for determining whether the final utilized capacity of the particular zone is equal to or greater than the storage space of the final flash block in response to receiving receive the zone close request;
means for associating the particular zone with the final flash block in response to determining the final utilized capacity of the particular zone is equal to the storage space of the final flash block; and
means for moving the host data from the staging area to the final flash block that is associated with the particular zone in response to associating the particular zone with the final flash block.

18. The apparatus of claim 17, further comprising:
means for associating the particular zone with a first flash block in response to determining the final utilized capacity of the particular zone is greater than the storage space of the final flash block;
means for moving a first portion of the host data from the staging area to the first flash block that is associated with the particular zone in response to associating the particular zone with the first flash block; and
means for maintaining a second portion of the host data in the staging area in response to associating the particular zone with the first flash block.

19. The apparatus of claim 15, further comprising:
means for associating the particular zone with the final flash block in response to determining that to the special indication is not received from the host regarding the particular zone in the ZNS;
means for receiving the host data from the host for storage in the particular zone;
means for staging the host data in the staging area in response to receiving the host data from the host;
means for determining whether the staging of the host data in the staging area for the particular zone is complete by determining whether the host data is approximately equal to or greater than a storage space of the final flash block; and
means for writing a portion of the host data from the staging area for the particular zone to the final flash block that is associated with the particular zone in response to determining that the staging of the host data in the staging area for the particular zone is complete.

20. The apparatus of claim 19, further comprising:
means for adding padding to the host data in response to determining that the staging of the host data in the staging area for the particular zone is not complete; and
means for writing the padding and the host data from the staging area to the final flash block that is associated with the particular zone in response to adding the padding to the host data,
wherein an amount of the padding and the host data is equal to the storage space of the final flash block.

* * * * *